United States
Shaw et al.

[11] 3,847,483
[45] Nov. 12, 1974

[54] OPTICAL OXIMETER APPARATUS AND METHOD

[75] Inventors: Robert F. Shaw, 50 St. Germain, San Francisco, Calif.; David P. Sidlauskas, San Jose; Donn D. Lobdell, Palo Alto, all of Calif.

[73] Assignee: Robert F. Shaw, San Francisco, Calif. ; by said Sidlauskas and Lobdell

[22] Filed: Sept. 24, 1973

[21] Appl. No.: 400,085

Related U.S. Application Data

[62] Division of Ser. No. 222,579, Feb. 2, 1972, abandoned.

[52] U.S. Cl. .................. 356/41, 128/2 L, 250/227, 350/96 B, 350/96 C
[51] Int. Cl. ............................................. G01n 33/16
[58] Field of Search ................ 356/39, 41; 128/2 L; 250/573, 574, 227

[56] References Cited
UNITED STATES PATENTS
3,647,299 3/1972 Lavallee ........................... 356/41

Primary Examiner—Vincent P. McGraw
Attorney, Agent, or Firm—A. C. Smith

[57] ABSTRACT

An improved oximeter operates at two radiation wavelengths, neither of which need be an isosbestic wavelength, to provide direct and accurate indications of oxygen saturation of blood substantially independently of variation in blood flow velocities, hematocrits and hemoglobin concentrations. Fiber optic light guides are arranged within a double-lumen catheter of improved design and reduced diameter for convenient insertion into a blood vessel of a patient. Dual detection and computing circuitry for use with a pair of catheters permits direct determination of arterial-venous oxygen difference as a useful indication of the adequacy of cardiac output.

24 Claims, 8 Drawing Figures

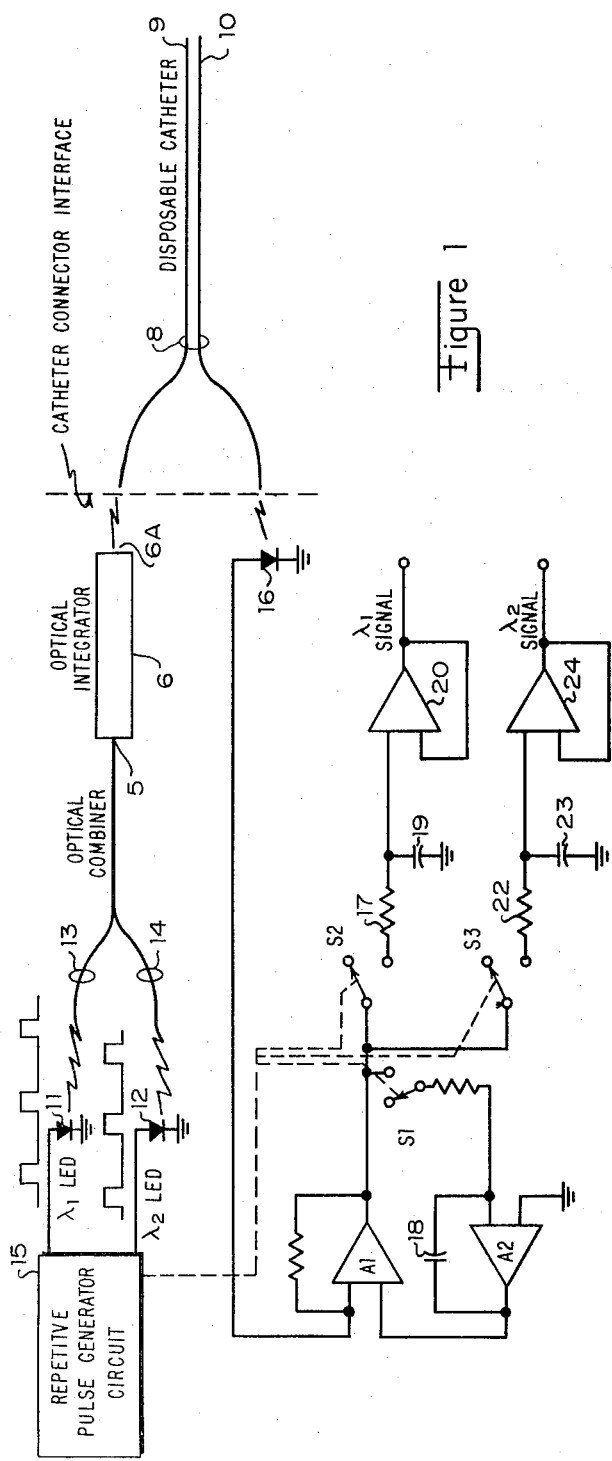
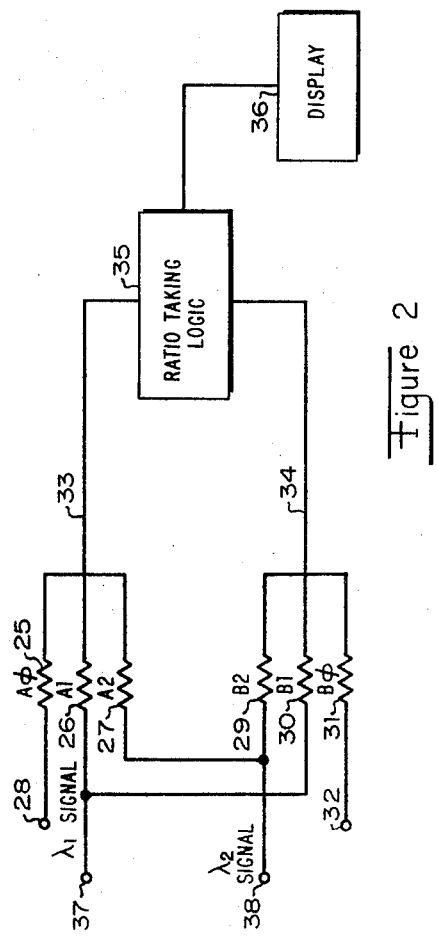
Figure 1
Figure 2

OPTICAL OXIMETER APPARATUS AND METHOD

This is a division, of application Ser. No. 222,579, filed Feb. 2, 1972, and now abandoned.

BACKGROUND OF THE INVENTION

Oxygen is the body's most important metabolite, required by every cell for function and survival. Paradoxically, oxygen is not stored in significant quantities in the body. Interruption of continuous and adequate oxygen transport to the cells for brief periods of only a few hundred seconds can result in unconsciousness and death. Accordingly, accurate, continuous real-time measurements of blood oxygen are of great importance in many clinical situations.

Certain known instruments have been used to determine blood oxygen saturation by measurement of the light reflected from the blood at each of two wavelengths. One type of such instrument requires acquisition of a blood sample by needle puncture of an artery or vein followed by measurement of light intensities reflected from the blood sample placed in a suitable cuvette. (See U.S. Pat. No. 3,177,757, Method of Performing Reflective Oximetry, issued on Apr. 13, 1965, to Michael Polanyi.) Use of such instruments involves the inconvenience and discomfort of blood sample acquisition, does not furnish real-time information and cannot furnish continuous measurement of the blood oxygen level of the blood, but rather can only furnish intermittent determinations.

Other known instruments furnish more continuous measurements of blood oxygen saturation by utilizing indwelling intravascular catheters which contain transmitting and receiving fiber optic light guides which permit light reflection measurements to be made from blood at the catheter tip. Instruments of this type have suffered from severe degradations in accuracy caused by variations in flow velocity, pH, hematocrit and hemoglobin concentrations of the blood being measured.

In such instruments, two methods have been used for introducing radiation into the transmitting fiber optic light guides. In instruments where a tungsten or similar wide band-width radiation source is used in conjunction with some wavelength-selective filtering means, some moving mechanical device such as a rotating filter wheel or chopper is used to alternately direct the radiation at each of the two wavelengths onto the entrance aperture of the transmitting fiber optic light guide. Alternatively, two stationary and spatially distinct narrow bandwidth radiation sources, such as semiconductor light-emitting diodes, have been used. In these latter cases, the catheters have utilized different fiber optic light guides to transmit radiation from each of the two sources. Although this latter method suffers the disadvantages of increasing the diameter of the catheter because of the greater number of transmitting fiber optic light guides required, it does alleviate the requirement for a bulky mechanical chopper at the proximal end of the catheter.

The transmitting and receiving fiber optic light guides of these catheters are typically constructed of hundreds of extremely small (0.0015 inch diameter) glass fibers. This method of construction is costly and these fibers are inherently fragile and easily damaged. Consequently, their high cost (hundreds of dollars) has limited the practical application of these catheters to the most serious cases.

Further, since these catheters utilize large numbers of transmitting fibers to illuminate the blood and large numbers of receiving fibers to capture the light reflected from the blood, the optical geometry of measurement, which is determined by the geometric relationships between the large numbers of fibers, is variable from catheter to catheter, necessitating individual calibrations of each individual catheter.

More recently, catheters have been constructed utilizing fiber optic light guides made of plastic materials. This change in materials furnishes a more durable catheter. However, the large numbers of plastic fiber optic light guides used perpetuate the problems of high cost of fabrication and variable optical geometry of measurement from catheter to catheter, as noted above.

Further, plastic fiber optic light guides in catheters for making oxygen saturation measurements introduce three additional problems that constitute sources of measurement error, namely: (1) increased light leakage into and out of the plastic fibers which contributes to optical cross-talk between transmitting and receiving light guides; (2) mechanical stresses upon the plastic fibers produce variations in the optical transmission characteristics of the light guides; and (3) water absorption by the plastic materials of the light guides produces variations in their optical transmission characteristics.

The prior art instruments are commonly based upon one of the two wavelengths utilized being an isosbestic wavelength (i.e., wavelength at which little or no difference appears in the optical reflectance of oxyhemoglobin vs. reduced hemoglobin). Oxygen saturation is then usually assumed to be a linear function of the ratio of light intensity reflected from the blood at the isosbestic and nonisosbestic wavelengths, as follows:

$$O.S. = A + B\, I_{(1)}/I_{(2)} \qquad (1)$$

where $I_{(1)}$ is light intensities diffusely backscattered from the blood at the isosbestic wavelength, $I_{(2)}$ is the light intensity diffusely backscattered at the nonisosbestic wavelength, and A and B are experimentally determined calibration constants.

While it can be experimentally demonstrated that the ratio of backscattered light bears a linear relationship to oxygen saturation provided that one of the wavelengths is isosbestic, it can also be demonstrated experimentally that the slope and offset of this linear relationship is a function of such physiologic parameters as blood flow velocity, blood pH, hematocrit and hemoglobin concentration. As a consequence of this, Equation (1) above is useful for determining oxygen saturation with accuracy only when one wavelength used is isosbestic and only when the variables of blood flow velocity, blood pH, hematocrit, and hemoglobin concentration of the blood being measured are identical to those that existed during the experimental determination of the calibration constants A and B. Any variations in these blood parameters from conditions that existed during determination of calibration constants A and B of Equation (1) produce errors in oxygen saturation determination when oxygen saturation is computed from Equation (1). The degrading effect that variations in these parameters have upon the accuracy of oxygen saturation determinations computed from the ratio of backscattered light intensities according to Equation (1) is well known and documented in the literature (see, for example, (1) Johnson, C., Palm, R., Stewart, D., and Martin, W., "A Solid State Fiberoptics Oximeter," J. Assn. Advan. Med. Instrum., 5:, 1971; (2) Mook, G. A., Osypka, P., Sturm, R. E., and Wood, E. H., "Fibre Optic Reflection Photometry in Blood," Cardiovasc. Res., 2:199–209, 1963; (3) Kapany, N. S. and Silbertrust, N., "Fiber Optics Spectrophotometer For In-Vivo Oximetry," Nature (London), 204:138–142, 1964; (4) Enson, Y., Briscoe, W. A., Polanyi, M. L., and Cournand, A., "In Vivo Studies with an Intravascular and Intracardiac Reflection Oximeter," J. Appl. Physiol., 17:552–588, 1962).

SUMMARY OF THE INVENTION

The present invention provides spectrophotometric apparatus and methods which accurately measure the oxygen saturation of blood in a blood vessel or other blood-confining container. The present apparatus operates at two light wavelengths, but removes the restrictive requirement that one of these wavelengths must be isosbestic. Changes in physiologic variables of the blood being measured, such as flow velocity, pH, hematocrit, and hemoglobin concentration, do not significantly alter the accuracy of the oxygen saturation measurement.

In the illustrated embodiment of the present invention, radiation sources and detectors are disposed at the proximal end of a catheter containing fiber optic light guides. Optic combining and integrating means disposed between the light sources and the catheter permit use of a single transmitting and a single receiving optical light guide (i.e., a single fiber or strand of fibers) of 10 mils or less diameter in conjunction with stationary narrow bandwidth sources, such as light-emitting diodes. The use of only two optical fibers as light guides in the present invention, in contrast to the scores or hundreds of fibers commonly used in the prior art, provides uniformity in the optical geometry of measurement between the apertures of the transmitting and receiving light guides at the distal end of the catheter, thus obviating the need to calibrate each and every catheter.

The catheter of the present invention has two lumina. One of these is open to the blood stream at its distal end and has a suitable connector at the proximal end so that it may be used for blood sampling, direct blood pressure measurement, and/or injection of parenteral fluids and drugs. The other lumen contains the fiber optic light guides and is sealed around the fibers at its distal end. Therefore, the optical fibers are not in contact with blood or other liquid except at their distal surface, thereby minimizing the absorption of water by the plastic material of which the light guides are preferentially made. The light guides are clad in an optically opaque material to eliminate light leakage into and out of the light guides which contributes to undesirable optical cross-talk between the transmitting and receiving fibers. In the preferred embodiment, the optically opaque material in which the fibers are clad is a relatively inert metal such as titanium or rhodium that is impervious to water. This protects the optical fibers from absorbing water which causes changes in their optical transmission characteristics that may be manifested as measurement "drifts" with time. One or more wires are also placed in the lumen containing the optical fibers to provide strain-relief means which prevent variations in optical transmission characteristics of the fiber as a consequence of mechanical stress. The lumen containing the optical light guides may contain a side hole near its distal tip that communicates with the interior of an inflatable balloon surrounding the distal catheter wall. A proximal connector to this lumen of the catheter and a passage space within the lumen permits the balloon to be inflated when the catheter tip is advanced to a position inside a large vein. This allows the catheter tip to be sailed by normal venous blood flow through selected veins and through the chambers of the heart to a "central venous" position in the pulmonary artery without the need for fluoroscopy and with only minimal disturbance to the patient. The preferred embodiment of the present invention in which only two fiber optic light guides are used permits size reduction of the catheter to a sufficiently small diameter that it can be inserted into a peripheral blood vessel through a needle puncture requiring seconds to perform, thus obviating the surgical cutdown operation which typically requires several minutes to perform.

Light transmitted down the single transmitting optical fiber at each of the two wavelengths, neither of which need be isosbestic, is diffusely backscattered from the blood flowing by the catheter tip. A portion of the backscattered light enters the aperture of the receiving optical fiber and is conducted through the fiber back to a detector disposed at the proximal end of the catheter. The detector responses at each of the illuminating wavelengths are then combined in accordance with the present invention to yield a measurement of blood oxygen saturation of far greater accuracy than previously attainable. The processing of light intensity measurements according to the present invention prevents degradation in the accuracy of oxygen saturation measurements due to variations in blood flow velocity, blood pH, hematocrit, hemoglobin, and the like.

The prior art method of measuring oxygen saturation (O.S.), as previously discussed in connection with Equation (1) above, requires that one of the measurement wavelengths must be an isosbestic wavelength. In contrast, the equation which describes the oxygen saturation measurement according to the present invention is:

$$O.S. = A\phi + A1 \times I_{(1)} + A2 \times I_{(2)}/B\phi + B1 \times I_{(1)} + B2 \times I_{(2)} \quad (2)$$

where:
O.S. = oxygen saturation
$A\phi$, $A1$, $A2$, $B\phi$, $B1$, $B2$ = calibration coefficients
$I_{(1)}$, $I_{(2)}$ = backscattered light intensities at two wavelengths, neither of which need be isosbestic.

It can be seen that Equation (2) contains additional calibration coefficients $A\phi$, $B\phi$, $A2$ and $B2$ and includes an additional second intensity-dependent term $B1\, I_{(1)}$ in the denominator.

DESCRIPTION OF THE DRAWINGS

FIG. 1 is a partial schematic diagram of the two-wavelength catheter oximeter of the present invention;

FIG. 2 is a schematic diagram of the display circuitry for the oximeter of FIG. 1;

DESCRIPTION OF THE PREFERRED EMBODIMENT

Figure 3:
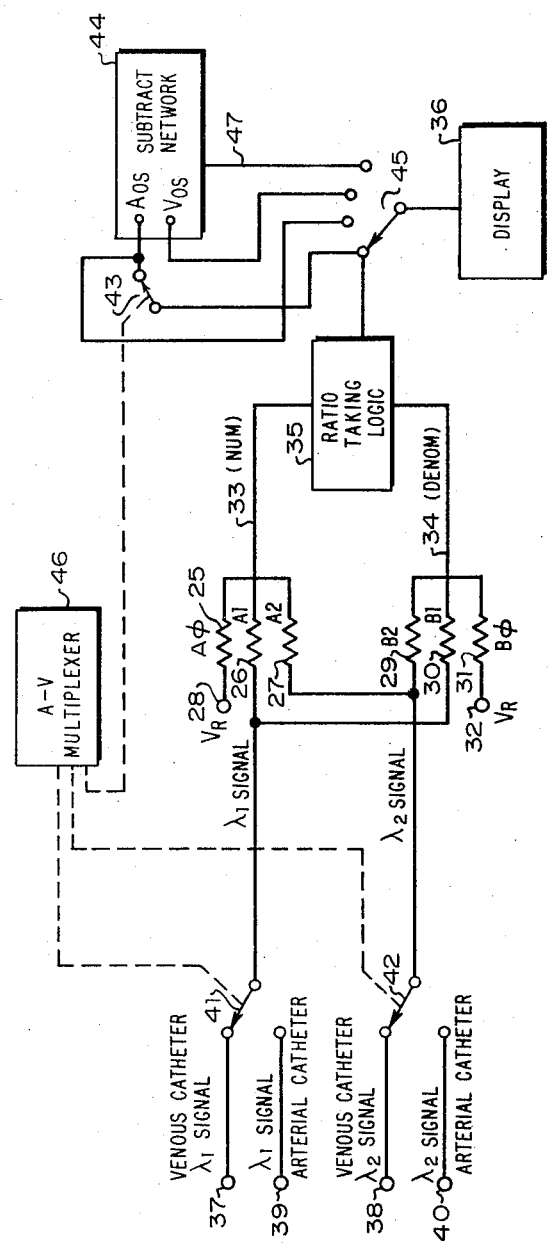
FIG. 3 is a schematic diagram of the arterial-venous oxygen difference computing circuitry of the present invention.

Referring to FIG. 1, there is shown a portion of the schematic diagram including the radiation source means, optical combiner and integrator means, catheter, detector, and signal processing means according to one embodiment of the present invention. The radiation source means includes two light-emitting diodes 11 and 12, which are arranged to alternately irradiate two branches 13 and 14 of a bifurcated fiber optic guide. The light-emitting diodes 11 and 12 are each alternately energized typically for about 25 percent of the operating cycle in non-overlapping relationship by the repetitive pulse generator 15. Thus, each period of energization is followed by a period of time of about 25 percent of the cycle during which neither of the light-emitting diodes 11 or 12 is energized.

Light-emitting diodes 11 and 12 emit radiation at wavelengths $\lambda 1$ and $\lambda 2$. This radiation is collected by fiber optic guides 13 and 14 which may contain one or more fibers. Fiber optic guides 13 and 14 are physically combined to form an optical interface 5 having an area with a minimum diameter that is equal to the total cross-sectional areas of guides 13 and 14 (i.e., if guides 13 and 14 are each circular of diameter $d$, then the diameter at interface 5 is $d\sqrt{2}$).

The radiation at interface 5 from light-emitting diodes 11 and 12 may be highly localized by wavelength such that the region which emits light at wavelength $\lambda 1$ does not also emit light at wavelength $\lambda 2$. The optical integrator 6 disposed contiguous to interface 5 is a single light-guide fiber having a diameter at least equal to that of interface 5 and having a length-to-diameter ratio of at least thirty to assure that the spatially separated radiation at interface 5 is uniformly distributed over exit aperture 6A. A single transmitting fiber or transmitting fiber bundle placed at aperture 6A thus receives uniform amounts of radiation at each of the two wavelengths and these amounts are not changed significantly by small transverse misalignments which might occur between optical integrator 6 and the transmitting fiber 9. In contrast, if a transmitting fiber were disposed at interface 5, small transverse misalignments would result in significant changes in the amounts of radiation received at each of the two wavelengths. The present invention produces spatially coherent, or "homogenized," radiation at aperture 6A from the two spatially separated light-emitting diodes 11 and 12 without the necessity for mechanically actuated optical elements. Thus, only one efferent fiber 9 of the catheter 8 is required to transmit the radiation at the two wavelengths, in contrast to prior art devices previously described which require either mechanical motion or the use of two transmitting branches of the catheter to transmit to the blood the radiation at the 2 wavelengths.

The transmitting light guide 9 of the catheter is arranged in close proximity to the exit aperture 6A of the optical integrator 6. The diameter of the transmitting light guide 9 may be less than the diameter of the exit aperture 6A to allow for small transverse variations in the alignment of the transmitting light guide 9 and exit aperture 6A without producing significant changes in the amount of radiation at either wavelength transmitted down light guide 9.

The transmitting light guide 9 and receiving light guide 10 in the preferred embodiment of the present invention each consists of only a single optical fiber. This greatly simplifies the construction of the catheter and makes possible a low cost disposable catheter that can be widely used. Further, use of only two optical fibers each having a diameter not greater than about 15 mils (typically about 10 mils each) for optical transmission and reception through the flexible catheter reduces the over-all diameter sufficiently to permit insertion into a peripheral artery or vein through a conveniently sized hollow transcutaneous needle. This reduces the time required for insertion to a matter of seconds, which compares favorably with the many minutes required for conventional surgical dissection and isolation of the vessel. More importantly, because only two optical fibers are used, a readily repeatable and inherently stable geometric relationship exists between the apertures of the fibers at the distal tip of the catheter 8. The transmitting and receiving fibers 9 and 10 are simply held axially parallel and in intimate contact with each other at the distal tip to provide an optical measurement geometry that is highly repeatable from catheter to catheter requiring no calibration to compensate for variations in the optical geometry of each individual catheter used. In contrast, prior art catheters which use a mulitplicity of fibers typically do not attain consistent optical geometry at the distal tip, and thus require that a calibration be performed for each individual catheter used.

The distal tip of the catheter 8 is immersed in blood, either in a blood vessel or other blood-confining container. Radiation from the transmitting light guide 9 at each of the two wavelengths is selectively absorbed and backscattered by the red cells, and a portion of the backscattered radiation enters the aperture at the distal tip of the receiving light guide 10. At the proximal end of the catheter 8, the aperture of light guide 10 is disposed adjacent the active area of the radiation detector 16 so that substantially all of the radiation exiting from light guide 10 impinges upon the active area of detector 16. The radiation signals detected by detector 16 are amplified by the detector amplifier $A_1$. During the times that neither of the light-emitting diodes 11 or 12 is emitting radiation, switch $S_1$ is closed by a signal from the repetitive pulse generator 15. This forms a closed loop servo system between amplifiers $A_1$ and $A_2$ which establishes a bias voltage on amplifier $A_1$ that adjusts its output voltage to zero. During the times that switch $S_1$ is open, this zero-correcting bias voltage for amplifier $A_1$ is maintained by the charge stored in the operationally connected feedback capacitor 18. This action assures that the output voltage of detector amplifier $A_1$ will be zero when the detector 16 is receiving no backscattered radiation and thereby compensates for amplifier drift and spurious outputs from the detector 16.

During the time that diode 11 is radiating, switch $S_2$ is closed by a signal from the repetitive pulse generator 15 and the signal voltage at the output of detector amplifier $A_1$ (due to the received radiation from the light-emitting diodes that is backscattered by the blood) is applied to the filter consisting of resistor 17 and capacitor 19. The action of switch $S_1$, resistor 18, and capacitor 19 thus produces an average signal voltage across capacitor 19 which is representative of the intensity of the radiation at the wavelength produced by light-emitting diode 11 and backscattered from the blood. This average signal voltage is amplified by amplifier 20 which provides a continuous output voltage that is directly related to the intensity of radiation at the wavelength produced by light-emitting diode 11 and backscattered from the blood.

Switch $S_3$, resistor 22, capacitor 23, and amplifier 24 operate in substantially the same manner during the alternate cycle while light-emitting diode 12 is energized to produce a continuous voltage at the output of amplifier 24 that is directly related to the intensity of radiation at the wavelength produced by light-emitting diode 12 and backscattered from the blood.

Referring to FIG. 2, there is shown a block diagram of the signal processor according to one embodiment of the present invention. The output signals from amplifiers 20 and 24 of FIG. 1 are applied to terminals 37 and 38, respectively, of FIG. 2. These signals and a pair of reference signals appearing at terminals 28 and 32 are combined in a resistive network including resistors 25, 26, 27, 29, 30 and 31 to produce a pair of resultant signals on lines 33 and 34. The resultant signal on line 33 is the algebraic summation of the signals appearing at terminals 28, 37 and 38 and is representative of the numerator of Equation (2) above. Similarly, the resultant signal on line 34 is the algebraic summation of the signals appearing at terminals 32, 37 and 38 and is representative of the denominator of Equation (2) above. These resultant signals are applied to logic circuit 35 which takes the ratio of the two signals 33 and 34 to produce an output signal that is indicative of the oxygen saturation of the blood under test. The oxygen saturation, displayed directly on a suitable display means 36 (e.g., a digital panel meter) is equal to:

$$O.S. = V_R A_o + I_{(1)} \times A_1 + I_{(2)} \times A_2 / V_R B_o + I_{(1)} \times B_1 + I_{(2)} \times B_2 \qquad (3)$$

where $V_R$ in the numerator and denominator are equal to reference voltages appearing at terminals 28 and 32, coefficients $A_o$, $A_1$, $A_2$, $B_o$, $B_1$ and $B_2$ are calibration coefficients corresponding to resistors 25, 26, 27, 31, 30, and 29, respectively, $I_{(1)}$ is the detected light intensity signal appearing at the output 37 of amplifier 20, and $I_{(2)}$ is the detected light intensity signal appearing at the output 38 of amplifier 24.

The value of the resistors 25–31 may be set initially by conducting actual tests with the catheter tip in blood of various known values of oxygen saturation and at a wide variety of blood flow rates, pH, hematocrit and hemoglobin concentration, and then computing the resistor values required to produce the proper display reading from the outputs of amplifiers 20 and 24 which correspond to the known values of oxygen saturation. Thereafter, the display 36 provides an accurate indication of oxygen saturation of the blood at the catheter tip independent of blood flow rate, pH, hematocrit or hemoglobin concentration.

In another embodiment of the oximeter apparatus, the fiber optic catheter 8 is eliminated and a suitable blood confining container is placed in close proximity to the exit aperture 6A of the optical mixer 6 and the detector 16.

In yet another embodiment, the light-emitting diodes 11 and 12 are intermittently energized at dissimilar repetition frequencies. In this embodiment, the circuit of FIG. 1 including switch $S_2$, resistor 17, capacitor 19 and amplifier 20 are replaced by a frequency-selective filter tuned to the energization frequency of light-emitting diode 11. A similar filter, tuned to the energization frequency of light-emitting diode 12, replaces switch $S_3$, resistor 22, capacitor 23 and amplifier 24. The outputs of the amplifiers 20 and 24 are thus directly related to the intensities of radiations at the respective wavelengths of the associated light-emitting diodes 11 and 12 and backscattered from the blood.

In yet another embodiment of this invention, a pair of fiber optic catheters is used, each with associated circuitry similar to the circuitry illustrated in FIG. 1. One catheter is placed in a systemic artery to measure arterial oxygen saturation, and the other catheter is placed in the right heart or pulmonary artery to measure mixed venous oxygen saturation. The difference between these two oxygen saturation readings yelds the A-V oxygen difference which is an excellent measure of the adequacy of cardiac output to meet the body's metabolic needs. In this embodiment, the duplicated circuitry of FIG. 1 produces a pair of signals at terminals 37 and 38 representative of venous oxygen saturation and another pair of signals at additional similar terminals 39 and 40 representative of arterial oxygen saturation, and these pairs of signals are applied to the saturation and A-V oxygen difference network, as shown in FIG. 3.

Referring now to FIG. 3, the signals corresponding to each wavelength from the signal sources and detectors of the arterial and venous catheters are connected to terminals 39, 40, 37 and 38, respectively, of the saturation and A-V oxygen difference computer. The A-V multiplexer 46 produces timing signals which are applied to operate switches 41 and 42 to connect simultaneously either to terminals 37 and 38 or to terminals 39 and 40. In this way, the signals for a given catheter are applied to the summing network including resistors 25, 26, 27, 29, 30 and 31 and reference supplies 28, 32, which summing network operates as previously described to produce resultant signals on lines 33 and 34 for the catheter being sampled by switches 41 and 42. The A-V multiplexer 46 also controls switch 43 in synchronism with operation of switches 41 and 42 in order to apply to the proper input (i.e., Arterial Oxygen Saturation or Venous Oxygen Saturation) of subtraction network 44 the oxygen-saturation signal produced by logic network 35 for the associated catheter. Subtraction network 44 may include conventional signalstorage means for each of the inputs $A_{os}$ and $V_{os}$ and a suitable signal difference network for producing on output 47 a signal which is equal to the difference between the stored input signals and which is representative of the A-V oxygen difference. This signal, together with the signals appearing at the inputs of subtraction network 44 and the signal appearing at the output of logic circuit 35, may be selected via switch 45 for display by the display means 36.

Figure 4:
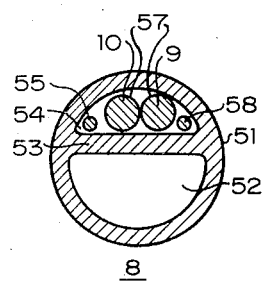
FIG. 4 is a sectional view of the catheter of the present invention.

Referring to FIG. 4, there is shown a sectional view of the catheter 8 of FIG. 1. The catheter includes a tube 51 containing lumen 52 and lumen 54 which are separated by a septum 53. The lumen 54, which contains the fiber optic light guides 9 and 10 (which may be either single fibers or bundles of fibers) and also contains wires or small multistrand cables 55 and 58, is sealed at its distal tip around the light guides 9 and 10.

Since the tube 51 is typically made of flexible thermoplastic, any stretching of the tube 51 introduces large tensile forces in the fiber optic light guides 9 and 10 which tend to alter the optical transmission characteristics of the guides. The wires 55 and 58 are selected to have a Young's modulus for extensional loads that is larger than the corresponding modulus of the fibers to assure that tensile forces are carried by the wires instead of by the fibers 9 and 10. The diameter of the wires 55 and 58 is sufficiently small that the bending stiffness of the catheter is not significantly increased.

Lumen 52 is open to the blood at its distal tip and has a suitable connector at its proximal end so that it may be used for blood sample withdrawal, direct blood pressure measurement and injection of parenteral fluids, medications, dyes, and the like. Septum 53 performs important operational functions in separating lumen 52 from lumen 54. Since variations in the liquid absorbed by the plastic material of the fiber optic light guides 9 and 10 cause variations in the optical transmission characteristics of guides 9 and 10, septum 53 serves to minimize absorption of water by the light guides by forming a barrier between the liquid-filled lumen 52 and the light guide-containing lumen 54. Light guides 9 and 10 are clad in an optically opaque material 57 to prevent leakage of ambient light into, and the escape of light out of, the light guides 9 and 10 and to prevent optical cross-talk between light guides 9 and 10. To further protect light guides 9 and 10 from variations in optical transmission characteristics caused by variable absorption of liquids by the plastic material of which they are made, the optically opaque clad material 57 may be made of an inert metal such as titanium or rhodium or other impervious material. Alternatively, variations in the optical transmission characteristics of light guides 9 and 10 caused by variable absorption of liquids into the plastic materials of light guides 9 and 10 may be combatted by cladding the light guides with an optically opaque material that is not impervious to the transmission of liquid and by injecting a suitable liquid into lumen 54 to saturate the plastic material of light guides 9 and 10. In this alternative embodiment, septum 53 performs the important function of preventing contamination of the blood stream by the material that is present in lumen 54 passing into the blood stream through lumen 52 (which is open at its distal tip).

If the oximeter catheter is to be used for "central venous" monitoring of oxygen saturation, lumen 54 may contain a side hole at its distal tip communicating with the interior of an inflatable balloon surrounding catheter tube 51 at its distal end. Through a proximal connector communicating with lumen 54, either gas in one embodiment or liquid in the alternate embodiment injected into lumen 54 may be used to inflate the distal balloon. When the catheter tip has been inserted into a vein and advanced to a vein of sufficient size, inflation of the balloon as described above furnishes a means whereby normal venous blood flow serves to drag the balloon through the great veins and through the cardiac chambers into a central venous position in the pulmonary artery, thereby furnishing a means for optimally positioning the catheter tip without the need for fluoroscopy and with minimum disturbance to the patient. In this position, the catheter of the present invention and the associated apparatus can continuously monitor mixed venous oxygen saturation, an excellent index of the integrated performance of the respiratory and the cardio-circulatory systems. The construction of the multiple-lumen catheter described above permits the catheter to be made sufficiently small in diameter to be inserted by means of transcutaneous needle puncture rather than by a conventional surgical cutdown operation where dissection of the blood vessel is required and where the distal blood vessel is sacrificed. Transcutaneous introduction of the catheter requires only seconds while surgical cutdown operations require many minutes. As a consequence, the range of medical cases wherein the present invention can be applied is considerably broadened.

Figure 5:
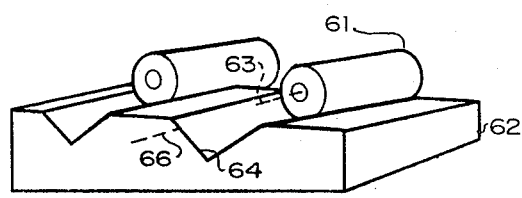
FIG. 5 is a perspective view of the catheter interface connector of FIG. 1.

Referring to FIG. 5, there is shown a perspective view of the clamping means disposed at the catheter-connector interface illustrated in FIG. 1. This clamping means permits simple and rapid physical connection and alignment between the proximal end of transmitting light guide 9 and the optical integrator exit aperture 6A and between the proximal end of receiving light guide 10 and the detector diode 16. The block 62 containing at least one vee groove 64 accurately positions a cylinder 61 in the groove 64 so that the center 63 of cylinder 61 (i.e., one light guide) is held in a definite spatial relationship with the groove 64. Another cylinder (not shown) of substantially the same diameter as cylinder 61 may thus be placed in the groove 64 such that the central axis 66 of such other cylinder (also containing a light guide) is accurately aligned with the central axis 63 of cylinder 61. The radiation propagating along one of the light guides disposed at the central axes 63 and 66 is thus efficiently transmitted to and captured by the other of the light guides which is thus held in axial alignment therewith. The clamping means may include suitable mechanisms for exerting lateral and longitudinal clamping forces on the cylinders (containing the centrally located light guides) to hold them in intimate engagement and axial alignment within a vee groove. Multiple, parallel vee grooves may be used to provide engagement and alignment for more than one optical path. Also, one cylinder per vee groove may be permanently clamped into the block (as part of the permanent measurement equipment) while the other cylinder (as part of a disposable catheter) may be temporarily clamped into alignment with the first cylinder during the course of an oxygen saturation measurement.

Figure 6:
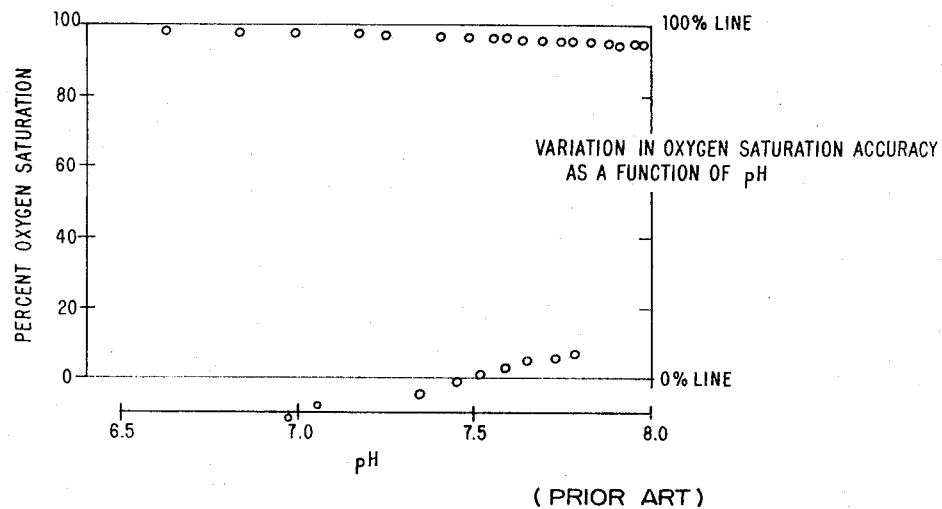
FIG. 6 is a graph demonstrating the error in measurement of blood oxygen saturation at 100 percent O.S. and 0 percent O.S. caused by pH variation when using the prior art.

Referring to FIG. 6, there is shown a graphic presentation of experimentally obtained data in which oxygen saturation of blood known to be 100 percent oxygen saturated and 0 percent oxygen saturated was determined as the pH of the blood was varied, utilizing the prior art techniques that implement Equation (1). The considerable error in measurement indicated in the graph of FIG. 6 is confirmed in the previously cited publication of Johnson et al. (at page 5) which describes errors of 1 percent oxygen saturation measurement for each 0.1 pH unit change.

Figure 7:
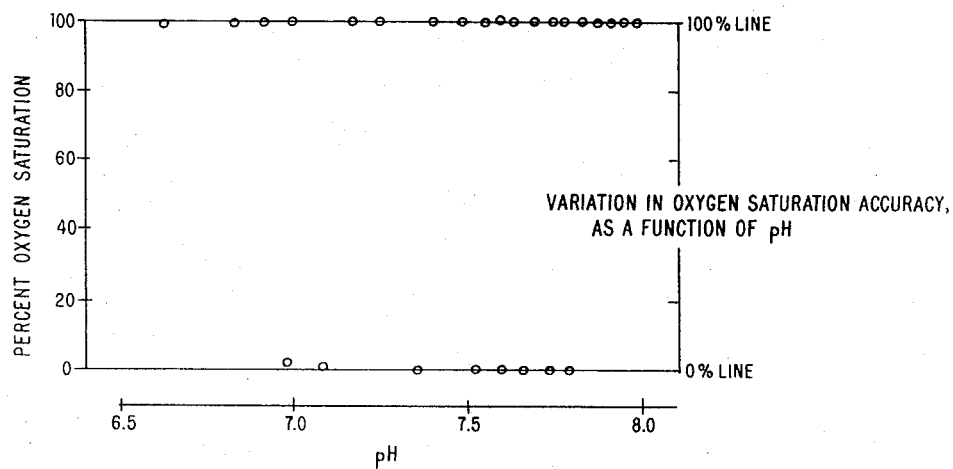
FIG. 7 is a graph demonstrating the freedom from error caused by pH variation in the measurement of oxygen saturation of blood at 100 percent O.S. and 0 percent O.S. when the present invention is used.

Referring to FIG. 7, there is shown a graphic presentation of experimentally obtained data in which oxygen saturation of blood known to be 100 percent saturated and 0 percent saturated was determined as the pH of the blood was varied, utilizing the techniques of the present invention which implement Equation (2). It should be noted that the light-intensity measurement data utilized to determine oxygen saturation for both FIG. 6 and FIG. 7 were identical.

Figure 8:
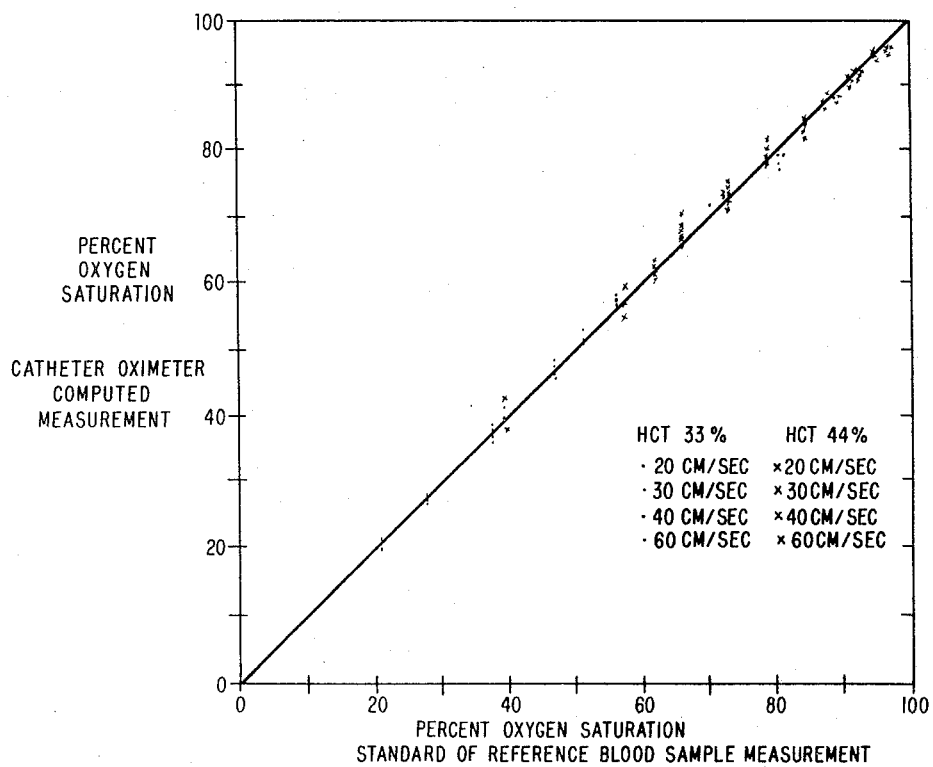
FIG. 8 is a graph demonstrating the high accuracy of oxygen saturation measurement which the present invention produces, notwithstanding large variations in blood hematocrit and blood flow velocity past the catheter tip.

Referring to FIG. 8, there is shown a graphic presentation of oxygen saturation measurements compared with simultaneous standard-of-reference measurements performed upon blood samples. The measurements presented in FIG. 8 were made using the catheter oximeter of the present invention under conditions of widely differing blood flow velocities, hematocrits and hemoglobin concentrations. However, it should be noted that the standard deviation of error between the measurements performed with the present invention and the standard-of-reference blood sample measurements is of the order of 1 percent oxygen saturation. In contrast, the catheter oximeters of the prior art, as reported in the references previously cited, typically incur errors in oxygen saturation measurements of 5 to 7 percent oxygen saturation (Mook et al.) and errors of 5 to 12 percent (Johnson et al.) due to blood-flow velocity variations. Kapany and Silbertrust also report similar effects. And Mook et al. reports errors in oxygen saturation measurement due to variations in hemoglobin concentration as high as 10 percent oxygen saturation. Johnson et al. and Enson et al. confirm similar sources of error.

We claim:

1. Apparatus for determining the oxygen saturation of blood, comprising:
   a plurality of electromagnetic radiation sources operable alternately and cyclically in selected timed sequence to produce electromagnetic radiation in a plurality of different wave bands;
   means coupled to said sources for providing a first optical path between said sources and an optical outlet port remote from said sources which is disposed to communicate with blood;
   detector means for producing electrical signals in response to electromagnetic radiation of each of said different wave bands applied thereto;
   means coupled to said detector means for providing a second optical path between said detector means and an optical inlet port which is disposed to communicate with the blood at a location in close proximity to said optical outlet port;
   signal means coupled to said detector means for producing an electrical signal for each of said radiation wave bands which is representative of the intensity of the radiation received by said detector means at the corresponding wave band;
   source means of first and second reference signals;
   first circuit means connected to receive said electrical signals and said first reference signal for producing a first electrical output as the combination of said electrical signals and first reference signal, each selectively weighted by a first set of coefficients;
   second circuit means connected to receive said electrical signals and said second reference signal for producing a second electrical output as the combination of said electrical signals and said second reference signal, each selectively weighted by a second set of coefficients; and
   means coupled to said first and second circuit means for producing a first output indicative of oxygen saturation of blood as the ratio of the first and second electrical outputs from said first and second circuit means.

2. Apparatus as in claim 1 wherein all said sources produce electromagnetic radiation at non-isosbestic wavelengths.

3. Apparatus as in claim 1 wherein:
   said first optical path includes a portion of optical path of fixed geometry and a portion of flexible optical path terminating at said optical outlet port;
   said portion of fixed geometry includes an optical element having a plurality of inlets, each optically coupled to receive radiation from a corresponding one of said radiation sources, and having a single outlet for transmitting radiation therethrough from said sources along said first optical path; and
   said sources are electrically actuatable to produce said wave bands of electromagnetic radiation in said timed sequence.

4. Apparatus as in claim 3 wherein said first optical path includes an optical integrator disposed intermediate said flexible portion and said element, said optical integrator including a light guide having a length-to-diameter ratio which produces radiation at the outlet of the optical integrator that is uniformly distributed over the area of the outlet substantially independently of spatial separation of radiation present over the area of the inlet of the optical integrator.

5. Apparatus as in claim 3 wherein said first optical path includes an optical connector disposed intermediate the flexible portion and said element for selectively disconnecting the flexible portion from the portion of fixed geometry.

6. Apparatus as in claim 1 wherein said optical outlet port and said optical inlet port for optically communicating with blood are substantially coplanarly disposed in immediately adjacent relationship.

7. Apparatus as in claim 1 comprising:
   at least another pair of electromagnetic radiation sources operable alternately and cyclically in selected timed sequence to produce electromagnetic radiation in a plurality of different wave bands;
   means coupled to said other sources for providing a third optical path between said other sources and an additional optical outlet port remote from said sources which is disposed to communicate with blood;
   second detector means for producing electrical signals in response to electromagnetic radiation of the different wave bands applied thereto from said other sources;
   means coupled to said second detector means for providing a fourth optical path between said detector means and an additional optical inlet port which is disposed to communicate with blood at a location in close proximity to said additional optical outlet port;

second signal means coupled to said second detector means for producing an electrical signal for each of said radiation wave bands which is representative of the intensity of the radiation received by said second detector means at the corresponding wave band;

additional source means of reference signals;

third circuit means connected to receive said electrical signals from said second signal means and an additional reference signal for producing a third electrical output as the combination of said electrical signals and additional reference signal selectively weighted by a third set of coefficients;

fourth circuit means connected to receive said electrical signals from said second signal means and an additional reference signal for producing a fourth electrical output as the combination of said electrical signals and additional reference signal selectively weighted by a fourth set of coefficients;

means coupled to said third and fourth circuit means for producing a second output indicative of oxygen saturation of blood as the ratio of the third and fourth electrical outputs from said third and fourth circuit means; and means coupled to receive said first and second outputs for providing an output indication of oxygen difference as the algebraic combination of said first and second outputs.

8. Apparatus as in claim 5 wherein:

said optical connector comprises alignment means including a plurality of V-shaped grooves;

a pair of cylindrically shaped housings disposed in each of said V-shaped grooves, one of the pair of housings in a V-shaped groove being attached to the portion of the respective optical path of fixed geometry; and the other of the pair of housings in a V-shaped groove being attached to the portion of the respective optical path of flexible geometry.

9. Apparatus as in claim 8 wherein the flexible and fixed geometry portions of each of the first and second optical paths are disposed substantially coaxially within the respective cylindrical housings for axial alignment of corresponding pairs thereof disposed within a common V-shaped groove.

10. Apparatus as in claim 9 comprising clamping means disposed with respect to said alignment means and the corresponding pairs of cylindrical housings in the V-shaped grooves for exerting forces thereon in axial and lateral directions for maintaining said corresponding pairs of cylindrical housings in aligned, abutting relationship.

11. Apparatus as in claim 3 wherein said portion of flexible optical path comprises a tube containing a pair of flexible, continuous optical light guides positioned therein along the length thereof.

12. Apparatus as in claim 11 wherein said tube includes a septum therein for separating the tube along the length thereof into first and second separated conduits;

said pair of light guides is contained within the first conduit along the length thereof; and the second conduit is disposed to conduct liquid therethrough, out of contact with the light guides in said first conduit.

13. Apparatus as in claim 11 comprising at least one continuous filament disposed in one of the first and second conduits along the length of the tube and having a higher modulus of elasticity than the modulii of elasticity of the combined pair of light guides and tube.

14. Apparatus as in claim 11 wherein said outlet port and said inlet port are each formed at the end of a light guide which includes at least one optical fiber and which has a diameter not greater than 15 mils.

15. Apparatus as in claim 11 wherein the total combined areas of the light guide outlet port and inlet port are not greater than 360 square mils.

16. Apparatus as in claim 11 wherein the flexible optical light guides are formed of radiation-transmissive plastic and the first one of said conduits contain liquid in contact with said light guides.

17. Apparatus as in claim 11 wherein said light guides are clad throughout their length with an opaque optical barrier.

18. Apparatus as in claim 16 wherein said optical barrier is impervious to fluid.

19. Apparatus as in claim 18 wherein said optical barrier is metal.

20. Apparatus as in claim 11 comprising:

an inflatable member surrounding the wall of the tube at its distal tip;

a fluid aperture through the wall of said tube near the distal end thereof communicating with the conduit containing the light guides and with the interior of the inflatable member; and connection means to the conduit containing the light guides near the proximal end thereof for introducing fluid under pressure to inflate the inflatable member.

21. Method of determining oxygen saturation comprising the steps of:

producing electromagnetic radiation in a plurality of different wave bands;

coupling the radiation in the plurality of different wave bands alternately to blood under test;

detecting radiation in each of the plurality of wave bands received back from the blood under test for producing a corresponding plurality of electrical signals representative of the intensities of radiation received from the blood under test at the respective wave bands;

altering by a first set of coefficients the plurality of electrical signals and a first reference signal for producing therefrom a first electrical output as a selected combination of said altered first and second electrical signals and first reference signal;

altering by a second set of coefficients the plurality of electrical signals and a second reference signal for producing therefrom a second electrical output as a selected combination of said altered first and second electrical signals and second reference signal; and producing a first output indication of oxygen saturation of the blood under test as the ratio of said first and second electrical outputs.

22. The method as in claim 21 wherein in the step of producing electromagnetic radiation, each of the plurality of wave bands contain only non-isosbestic wavelengths.

23. The method according to claim 21 wherein in the step of coupling the radiation, the electromagnetic radiation in the plurality of wave bands are alternately transmitted to the blood under test along a first common optical transmission path; and in the step of detecting radiation, the radiation in the plurality of wave bands is received from the blood under test and is transmitted along a second common optical transmission path from an inlet port disposed within the blood under test adjacent an outlet port of the first common optical transmission path.

24. Method as in claim 21 comprising the additional steps of:

producing electromagnetic radiation in a plurality of auxiliary different wave bands;

coupling the radiation in the auxiliary wave bands alternately to the blood under test along an additional auxiliary coupling path;

detecting radiation in said auxiliary wave bands received back from the blood under test for producing third and fourth electrical signals representative of the intensities of radiation received back from the blood under test at the respective ones of said auxiliary wave bands;

altering by a third set of coefficients the third and fourth electrical signals and a first additional reference signal for producing therefrom a third electrical output as a selected combination of said altered third and fourth electrical signals and first additional reference signal;

altering by a fourth set of coefficients the third and fourth electrical signals and a second additional reference signal for producing therefrom a fourth electrical output as a selected combination of said altered third and fourth electrical signals and second additional reference signal;

producing a second output indication of oxygen saturation of the blood under test as the ratio of the third and fourth electrical outputs; and providing an output indication of oxygen difference as the algebraic combination of said first and second outputs.

* * * * *